United States Patent [19]

DeMinco et al.

[11] Patent Number: 4,693,393
[45] Date of Patent: Sep. 15, 1987

[54] FUEL VAPOR STORAGE CANISTER HAVING TORTUOUS VENT PASSAGE

[75] Inventors: Chris M. DeMinco, West Rush; Martin J. Field, Churchville; Richard K. Judd, Rochester, all of N.Y.

[73] Assignee: General Motors Corporation, Detroit, Mich.

[21] Appl. No.: 917,672

[22] Filed: Oct. 10, 1986

Related U.S. Application Data

[63] Continuation-in-part of Ser. No. 849,807, Apr. 9, 1986, abandoned.

[51] Int. Cl.⁴ ............................................. B65D 51/16
[52] U.S. Cl. .................................................. 220/374
[58] Field of Search ................. 220/374, 366; 215/307

[56] References Cited

U.S. PATENT DOCUMENTS

| | | | |
|---|---|---|---|
| 3,385,467 | 5/1968 | Lindenberg | 220/374 |
| 4,036,393 | 7/1977 | Neiman | 220/374 |
| 4,460,101 | 7/1984 | Tseng | 215/307 |

OTHER PUBLICATIONS

1986 Buick Chassis Service Manual, FIG. C3-1 and text on p. 6E1-C3-1.

Primary Examiner—George T. Hall
Attorney, Agent, or Firm—C. K. Veenstra

[57] ABSTRACT

A fuel vapor storage canister has inner and outer covers that define a labyrinth through which the purge air flow is directed. The labyrinth inhibits ingestion of water and dirt as purge air is drawn into the canister.

2 Claims, 4 Drawing Figures

FUEL VAPOR STORAGE CANISTER HAVING TORTUOUS VENT PASSAGE

RELATED APPLICATION

This is a continuation-in-part of U.S. patent application Ser. No. 849807 filed Apr. 9, 1986, now abandoned.

TECHNICAL FIELD

This invention relates to control of fuel vapor released from a fuel tank.

SUMMARY OF THE INVENTION

During day to day operation of an automotive vehicle, the temperature of the vehicle fuel tank rises and falls. As the fuel tank temperature rises, some of the fuel vapor in the space above the liquid level is displaced out of the tank. To avoid releasing the fuel vapor to the atmosphere, the existing system vents the vapor to a canister having a bed that absorbs and stores the fuel vapor.

In existing systems, the fuel vapor is purged from the canister by drawing purge air into the canister and through the bed.

This invention provides a canister having inner and outer covers that define a labyrinth through which the purge air must flow to the canister. The labyrinth inhibits ingestion of water and dirt as the purge air is drawn into the canister.

The details as well as other features and advantages of a preferred embodiment of this invention are set forth in the remainder of the specification and are shown in the drawing.

THE PREFERRED EMBODIMENT

Figure 1:
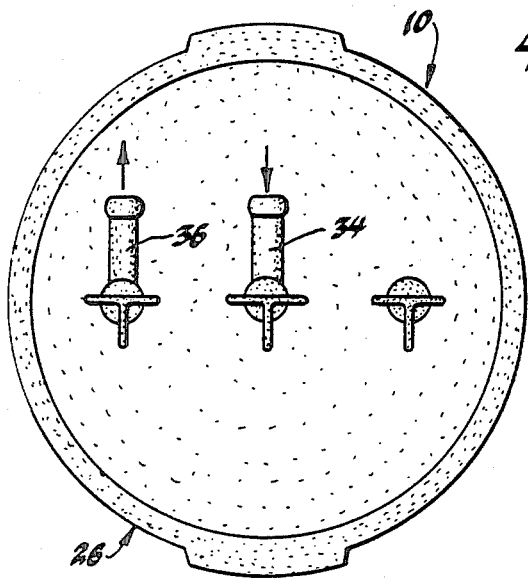
FIG. 1 is a bottom view of a preferred embodiment of a fuel vapor storage canister employing this invention.
Figure 2:
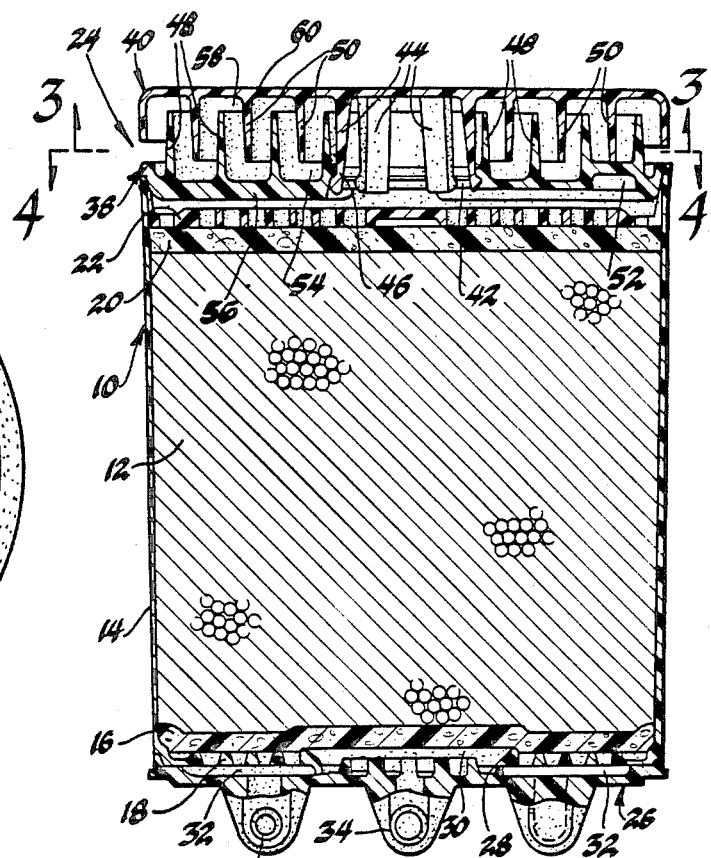
FIG. 2 is a section elevational view of the FIG. 1 canister.
Figure 3:
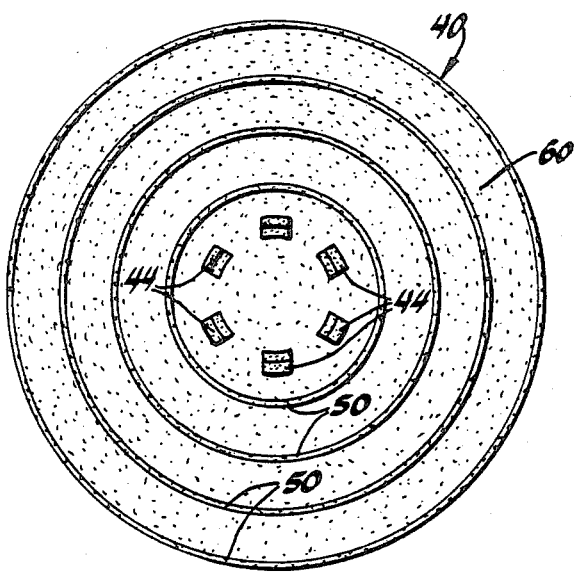
FIG. 3 is an internal view, indicated by the line 3—3 of FIG. 2, of the outer cover for the top of the canister.
Figure 4:
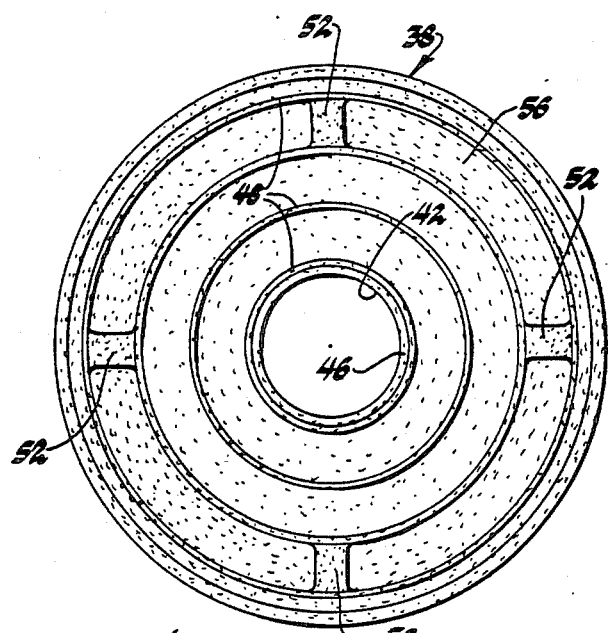
FIG. 4 is an end view, indicated by the line 4—4 of FIG. 2, of the inner cover for the top of the canister.

Referring to the drawing, a fuel vapor storage canister 10 has a bed 12 of activated carbon adapted to absorb fuel vapor. Bed 12 is supported in a housing 14 between a lower foam screen 16 that rests on a grid 18 extending across the lower end of housing 14, and an upper foam screen 20 that is secured by a grid 22 extending across the upper end of housing 14. Grid 22 opens to the atmosphere through an upper cover assembly 24.

A lower cover 26 is secured to housing 14 at the bottom of canister 10. Cover 26 engages an annular lip 28 projecting from grid 18 to divide the space between cover 26 an grid 18 into a central inlet region 30 and an annular purge region 32. Cover 26 includes a fuel vapor inlet tube 34 opening into inlet region 30, and a purge tube 36 opening from purge region.

Inlet tube 34 receives a mixture of fuel vapor and air discharged from a fuel tank (not shown). As the mixture enters inlet chamber 30 and rises through bed 12, the activated carbon in bed 12 absorbs the fuel vapor and the air flows out through upper cover assembly 24.

Fuel vapor is purged from canister 10 by applying vacuum to purge tube 36. The vacuum draws air in through upper cover assembly 24, down through bed 12, and into purge chamber 32. The air flow desorbs the fuel vapor, and resulting mixture of air and fuel vapor is drawn out through purge tube 36.

Cover assembly 24 includes an inner cover 38 and an outer cover 40. Inner cover 38 is secured to housing 14 and has a central aperture 42 opening through grid 22 and screen 20 to bed 12. Outer cover 40 has a plurality of resilient fingers 44 that are received in aperture 42 and grip the rim 46 of aperture 42 to hold outer cover 40 on inner cover 38.

Inner cover 38 has four concentric cylindrical barriers 48 projecting upwardly around aperture 42, and outer cover has four concentric depending cylindrical barriers 50 interleaved with barriers 48. Inner and outer covers 38 and 40 thereby form a labyrinth that allows air flow to central aperture 42, and prevents both water and dust from reaching aperture 42.

Inner cover 38 has four braces 52 extending radially between the outermost barriers 48. Braces 52 are engaged by one of the barriers 50 depending from outer cover 40 to keep outer cover 40 spaced from inner cover 38.

The clearance 54 between the bottom of barriers 50 depending from outer cover 40 and the base 56 of inner cover 38 exceeds the clearance 58 between the top of barriers 48 projecting from inner cover 38 and the roof 60 of outer cover 40, thereby allowing dirt to accumulate on the base 56 of inner cover 38 without restricting air flow to aperture 42.

The embodiments of the invention in which an exclusive property or privilege is claimed are defined as follows:

1. A fuel vapor storage canister comprising a housing having a bed of material adapted to absorb fuel vapor, an inner cover having a base closing one end of said housing, said base having a central aperture for air flow into said bed, said inner cover further having a plurality of concentric barriers surrounding said aperture and projecting outwardly from said base, an outer cover supported on said inner cover, said outer cover having a roof and a plurality of concentric barriers projecting inwardly from said roof, said outer cover barriers being interleaved with said inner cover barriers to define a labyrinthine passage for air flow to said aperture, said covers thereby inhibiting the passage of water and dust to said aperture.

2. A fuel vapor storage canister comprising a housing having a bed of material adapted to absorb fuel vapor, an inner cover having a base closing one end of said housing, said base having a central aperture for air flow into said bed, said inner cover further having a plurality of concentric barriers surrounding said aperture and projecting outwardly from said base, an outer cover having a roof and a plurality of concentric barriers projecting inwardly from said roof, said outer cover barriers being interleaved with said inner cover barriers to define a labyrinthine passage for air flow to said aperture, said covers thereby inhibiting the passage of water and dust to said aperture, said outer cover further having a plurality of resilient fingers received in and gripping the rim of said aperture to support said outer cover on said inner cover, said inner cover further having a plurality of braces extending radially between a pair of inner cover barriers and engaged by one of said outer cover barriers to keep said outer cover spaced from said inner cover.

* * * * *